United States Patent
Zhou et al.

(10) Patent No.: US 10,919,491 B2
(45) Date of Patent: Feb. 16, 2021

(54) ALARMING SYSTEM FOR A WIPER AND A WIPER BLADE ASSEMBLY WITH ALARMING FUNCTION

(71) Applicant: Taizhou Valeo Wenling Automotive Systems Co., Ltd., Shanghai (CN)

(72) Inventors: Chengbin Zhou, Shanghai (CN); Xu Cheng, Shanghai (CN)

(73) Assignee: Taizhou Valeo Wenling Automotive Systems Co., Ltd., Shanghai (CN)

( * ) Notice: Subject to any disclaimer, the term of this patent is extended or adjusted under 35 U.S.C. 154(b) by 207 days.

(21) Appl. No.: 16/009,498

(22) Filed: Jun. 15, 2018

(65) Prior Publication Data

US 2018/0361989 A1    Dec. 20, 2018

(30) Foreign Application Priority Data

Jun. 15, 2017   (CN) .......................... 201710454006.X

(51) Int. Cl.
   *B60R 25/104*   (2013.01)
   *B60S 1/40*     (2006.01)
   (Continued)

(52) U.S. Cl.
   CPC .......... *B60R 25/104* (2013.01); *B60R 25/305* (2013.01); *B60S 1/0491* (2013.01);
   (Continued)

(58) Field of Classification Search
   CPC ..... B60R 25/1001; B60R 25/01; B60R 25/00; B60R 25/104; B60R 25/405;
   (Continued)

(56) References Cited

U.S. PATENT DOCUMENTS

| | | | | |
|---|---|---|---|---|
| 3,465,279 A | * | 9/1969 | Krehbiel | ................ H01R 13/04 439/161 |
| 5,027,104 A | * | 6/1991 | Reid | ........................ B60R 1/00 340/426.18 |
| 2013/0097801 A1 | * | 4/2013 | Schaeuble | ............. B60S 1/3805 15/250.32 |

FOREIGN PATENT DOCUMENTS

| | | |
|---|---|---|
| CN | 102205833 A | 10/2011 |
| CN | 102350981 A | 2/2012 |

(Continued)

OTHER PUBLICATIONS

Machine language translation of description portion of CN102350981, published Feb. 2012. (Year: 2012).*

(Continued)

*Primary Examiner* — Gary K. Graham
(74) *Attorney, Agent, or Firm* — Osha Bergman Watanabe & Burton LLP

(57) ABSTRACT

The invention relates to an alarming system of a wiper, which comprises: a first connecting member, comprising a first body and a first number of first contacts which are insulated to each other and disposed at the first body; a second connecting member, comprising a second body and a first number of second contacts which are electrically connected to each other and disposed at the second body; and control member; any one of the first connecting member or the second connecting member is connected to a wiper arm; the other one of the first connecting member or the second connecting member is connected to a wiper blade; the first number is equal to or larger than two; when the wiper blade is properly mounted to the wiper arm, the first connecting member is connected to the second connecting member, such that each of the first contacts is in contact with corresponding one of the second contacts, and thereby the first contacts are electrically connected to each other through (Continued)

the second contacts; the control member are configured to sense the electrical connection between the first contacts, and to generate alarm signal when sensing that the electrical connection between the first contacts is disconnected.

22 Claims, 8 Drawing Sheets

(51) Int. Cl.
 *B60S 1/04* (2006.01)
 *B60R 25/30* (2013.01)
 *H04N 5/232* (2006.01)
(52) U.S. Cl.
 CPC ............... *B60S 1/40* (2013.01); *B60S 1/4045* (2013.01); *H04N 5/232* (2013.01); *B60R 2325/10* (2013.01)
(58) Field of Classification Search
 CPC ...... B60R 2325/10; B60S 1/40; B60S 1/4038; B60S 1/0491; B60S 1/3805; B60S 1/4045

USPC ........................................ 15/250.32, 250.001
 See application file for complete search history.

(56) References Cited

FOREIGN PATENT DOCUMENTS

| | | |
|---|---|---|
| CN | 204136942 U | 2/2015 |
| CN | 106696905 A | 5/2017 |
| DE | 4311012 C1 | 9/1994 |
| DE | 19922054 A1 | 11/1999 |

OTHER PUBLICATIONS

Machine language translation of description portion of CN106696905, published May 2017. (Year: 2017).*
Novelty Search Report Issued in Corresponding Chinese Application No. 201710454006.X, dated Feb. 24, 2018 (8 Pages).

* cited by examiner

ALARMING SYSTEM FOR A WIPER AND A WIPER BLADE ASSEMBLY WITH ALARMING FUNCTION

TECHNICAL FIELD

The invention relates to an alarming system, and in particular, to an alarming system for a wiper of a motor vehicle. The invention also relates to a wiper blade assembly, and in particular to a wiper blade assembly with alarming function.

BACKGROUND

Motor vehicles are usually equipped with a wiper system, which is used to clean the windshield. Traditional wiper system generally includes a wiper blade, a wiper arm, and transmissions. The wiper arm is driven by the transmission to perform a swing motion, driving the wiper blade to move in conjunction. The wiper blade wipes the windshield and removes foreign objects on the windshield out of the driver's field of vision.

Generally, the wiper blade and the wiper arm are detachably connected together by a wiper arm adapter provided at one end of the wiper arm and a wiper blade adapter provided on the wiper blade. In order to facilitate the replacement of the wiper blade, the connection is usually simple and easily detached, with the result that the wiper blade being easily stolen. In addition, installation errors between the wiper arm and the wiper blade may sometimes occur due to a careless installation. Therefore, there is a need for an alarming system and a wiper blade with an alarming function to alarm the stealing or improper installation of the wiper blade.

DESCRIPTION OF THE INVENTION

In order to solve the problems in the prior art, it is an object of the present invention to provide an alarming system for a wiper, which can be used to issue an alarm when a wiper blade is stolen or improperly mounted.

An alarming system for a wiper comprises: a first connecting member comprising a first body and a first number of first contacts which are insulated to each other and disposed at the first body; a second connecting member comprising a second body and a first number of second contacts which are electrically connected to each other and disposed at the second body; and control member; wherein any one of the first connecting member or the second connecting member is connected to a wiper arm; the other one of the first connecting member or the second connecting member is connected to a wiper blade; the first contacts and the second contacts are made of conductive material, the first body and the second body are made of insulated material, the first number is equal to or larger than two; when the wiper blade is properly mounted to the wiper arm, the first connecting member is connected with the second connecting member, such that each of the first contacts is in contact with corresponding one of the second contacts, and thereby the first number of the first contacts are electrically connected to each other through the first number of the second contacts; and the control member is configured to sense the electrical connection between the first contacts, and to generate alarm signal when the electrical connection between the first contacts is disconnected.

Preferably, the control member is configured to send an alarm information to an alarm information receiver.

Preferably, the alarm information receiver is a mobile terminal.

Preferably, the control system is configured to control the camera of a vehicle to capture images surrounding the vehicle or to ring the alarm of the vehicle after generating the alarm signal.

Preferably, the control member is located at a body of the vehicle.

Preferably, the control member is included in an electronic control unit of the vehicle.

Preferably, the one of the first connecting member and the second connecting member which is connected to the wiper arm is the first connecting member, the first contacts are connected to the corresponding inputs of the control member through signal lines respectively, and at least a portion of the signal lines extend along the wiper arm and are fixed to the wiper arm.

Preferably, the alarming system further comprises a wireless transmitting member and a wireless receiving member; the control member is configured to sense the electrical connection between the first contacts by the wireless transmitting member and the wireless receiving member, the wireless transmitting member is located in the first body, the first contacts are electrically connected to the corresponding inputs of the wireless transmitting member respectively, the control member is coupled to the wireless receiving member or comprises the wireless receiving member.

Preferably, the second body is provided with on one side face thereof a first number of grooves which are open towards a same direction, and the first number of the second contacts are disposed in the first number of grooves respectively.

Preferably, the first body is provided with on one side face thereof a first number of rod-shaped projections, the first number of first contacts are disposed on outer surfaces of the first number of rod-shaped projections respectively; and the grooves receive the rod-shaped projections.

Preferably, the first contacts are of rod shape, and are connected to one side face of the first body; and the grooves receive the first contacts.

Preferably, the other one of the first connecting member and the second connecting member is connected to wiper blade adapter, and the extending direction of the grooves is in consistent with the longitudinal axis of the wiper blade adapter.

Preferably, the first body is provided with on one side face thereof a first number of grooves which are open towards a same direction, and the first number of the first contacts are disposed in the first number of grooves respectively.

Preferably, the second body is provided with on one side face thereof a first number of rod-shaped projections, the first number of second contacts are disposed on outer surfaces of the first number of rod-shaped projections respectively; and the grooves receive the rod-shaped projections.

Preferably, the second contacts are of rod shape, and are connected to one side face of the second body; and the grooves receive the second contacts.

Preferably, the other one of the first connecting member and the second connecting member is connected to wiper blade adapter, and the extending direction of the grooves is in consistent with the longitudinal axis of the wiper blade adapter.

Preferably, the other one of the first connecting member and the second connecting member is snap-fined in the housing of the wiper blade adapter.

Preferably, the one of the first connecting member and the second connecting member is snap-fitted in the housing of the wiper arm adapter.

Preferably, the one of the first connecting member and the second connecting member is connected to the wiper arm by a flexible connecting member.

Preferably, while the wiper blade adapter is properly mounted to wiper arm adapter, the first connecting member is connected to the second connecting member.

Preferably, the first number of second contacts are formed in one piece.

Preferably, the first body is formed integral with a wiper arm adapter, the second body is formed integral with a wiper blade adapter.

An further object of the invention is to provide a wiper blade assembly with a alarming function, which comprises: a wiper blade, a wiper blade adapter, and a second connecting memberfixed in a housing of the wiper blade adapter and comprising a second body and a first number of second contacts which are disposed in the second body and are electrically connected to each other; wherein the second contacts are made of conductive material, the second body is made of insulated material, the first number is equal to or larger than two.

Preferably, the second body is provided with on one side face thereof a first number of grooves which are open towards a same direction, and the first number of the second contacts are disposed in the first number of grooves respectively.

Preferably, the second body is provided with on one side thereof a first number of rod-shaped projections, and the first number of second contacts are disposed on outer surfaces of the first number of rod-shaped projections respectively.

Preferably, the second contacts are of rod shape, and are connected to one side face of the second body.

The invention further provides a wiper blade assembly with a alarming function, which comprises: a wiper blade, a wiper blade adapter, and a first connecting member fixed in a housing of the wiper blade adapter and comprising a first body and a first number of first contacts which are disposed in the first body and are electrically insulated to each other; and wireless transmitting member, located in the first body, the first contacts electrically connected to corresponding inputs of the wireless transmitting member respectively; wherein the first contact are made of conductive material, the first body is made of insulated material, the first number is equal to or larger than two.

Preferably, the first body is provided with on one side face thereof a first number of rod-shaped projections, the first number of first contacts are disposed on outer surfaces of the first number of rod-shaped projections respectively.

Preferably, the first contacts are of rod shape, and are connected onto one side face of the first body.

Preferably, the first body is provided with on one side face thereof a first number of grooves which are open towards a same direction, and the first number of the first contacts are disposed in the first number of grooves respectively.

DESCRIPTION OF THE DRAWINGS

In order to explain the technical solutions of the embodiments of the present invention more clearly, the drawings used in the embodiments will be briefly described below. It should be understood that, the following drawings merely illustrate some embodiments of the present invention and therefore should not be regarded as a limitation of the protective scope. For those skilled in the art, other related drawings may also be obtained based on these drawings without any creative effort.

DETAILED DESCRIPTION

Hereinafter, the alarming system according to an embodiment of the invention will be described in detail with reference to the accompanying drawings. To make the objectives, the technical solutions, and the advantages of the embodiments of the present invention clearer, the following describes the technical solutions in the embodiments of the present invention clearly and comprehensively in conjunction with the accompanying drawings of the embodiments of the present invention. Obviously, the described embodiments are only a portion of the embodiments of the present invention, not all of the embodiments.

Thus, the following detailed description of embodiments of the invention, as provided in conjunction with the accompanying drawings, is not intended to limit the scope of the invention as claimed, but is merely representative of selected embodiments of the invention. All other embodiments obtained by a person of ordinary skill in the art based on the embodiments of the present invention without creative efforts shall fall within the protection scope of the present invention.

In the description of the invention, it should be understood that the connection between one part and another part is not limited to direct connection but may also be connection through other parts.

In the following description, numerous specific details are set forth to provide a thorough understanding of the embodiments. However, those skilled in the relevant art will recognize that the techniques described herein may be practiced without one or more of the specific details or through other methods, components, materials, or the like. In other instances, well-known structures, materials, or operations are not shown or described in detail to avoid obscuring aspects. In addition, certain features, structures may be combined in any suitable manner in one or more embodiments.

Figure 1:
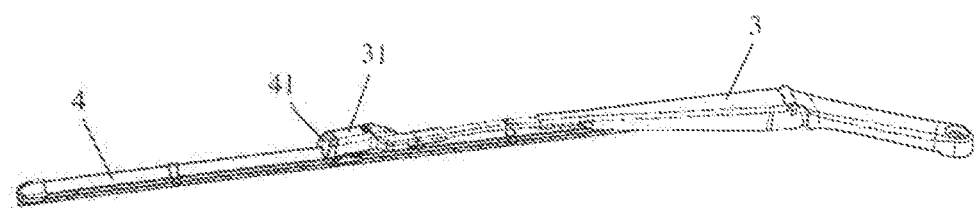
FIG. 1 illustrates a perspective view of the alarming system according to an embodiment of the invention.
Figure 2:
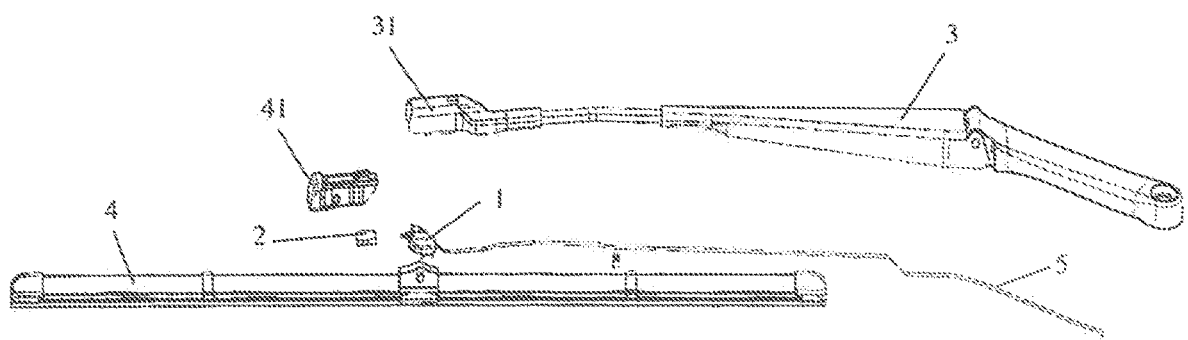
FIG. 2 illustrates an exploded view of the alarming system according to an embodiment of the invention.

FIG. 1 illustrates a perspective view of the alarming system for an wiper according to an embodiment of the invention, and FIG. 2 illustrates an exploded view of the alarming system according to an embodiment of the invention. As shown in FIGS. 1 and 2, an alarming system for a wiper comprises a first connecting member 1 and a second connecting member 2. In this embodiment, the first connecting member 1 is connected to the wiper arm 3, and the second connecting member 2 is connected to the wiper blade 4. The engagement between the wiper blade 4 and the wiper arm 3 is achieved by the engagement of the wiper blade adapter 41 and the wiper arm adapter 31. In this embodiment, the wiper blade adapter 41 is snap-fitted into the wiper arm adapter 31 by pushing the wiper blade adapter 41 into the wiper arm adapter 31 along a long-axis direction of the wiper blade adapter 41, and thus the engagement of the wiper blade 4 with the wiper arm 3 is achieved.

Figure 3:
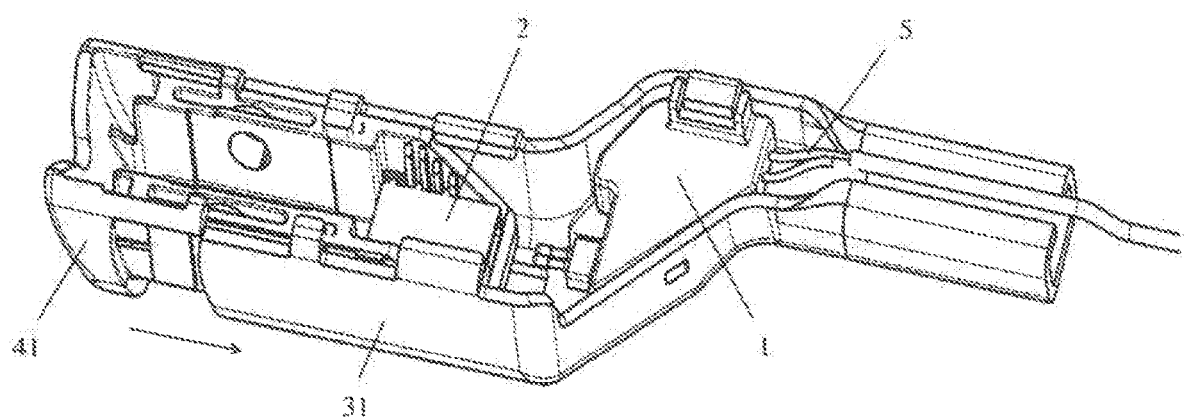
FIG. 3 illustrates an enlarge view of the alarming system according to an embodiment of the invention, in which the first connecting member is not engaged with the second connecting member.
Figure 4A:
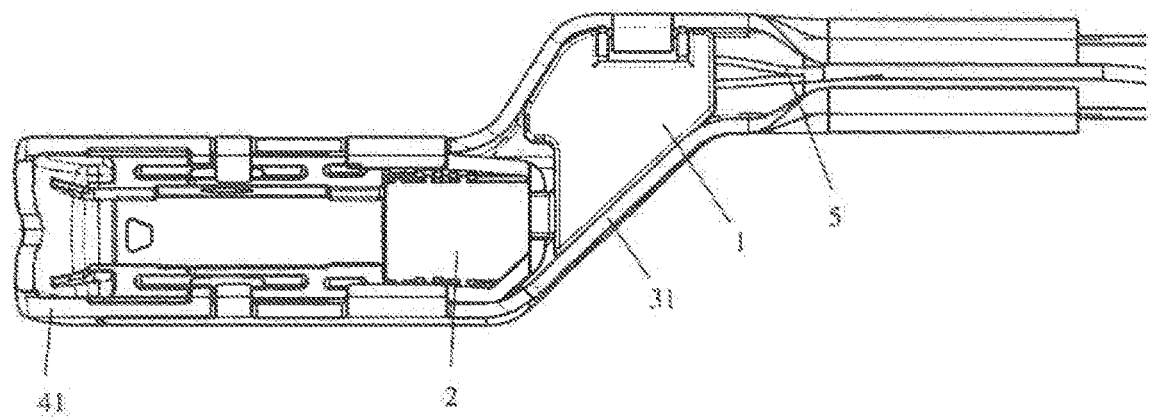
FIG. 4a illustrates an enlarge view of the alarming system according to an embodiment of the invention, in which the first connecting member is engaged with the second connecting member.
Figure 4B:
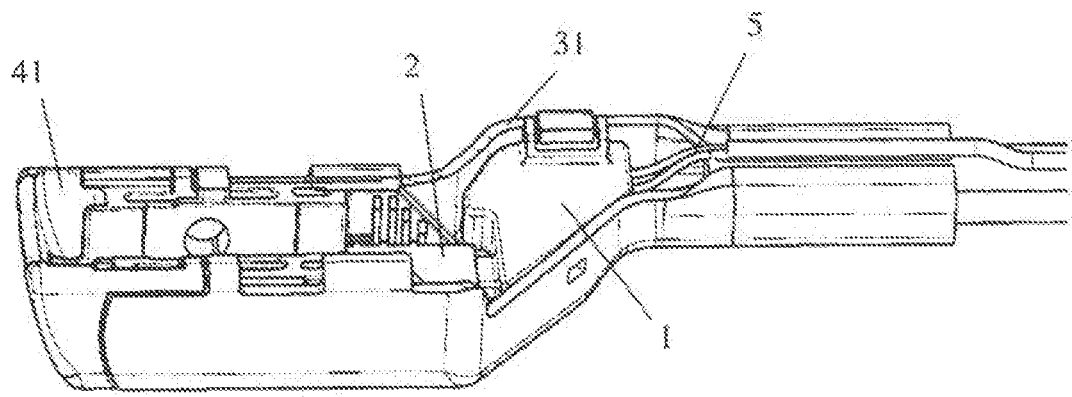
FIG. 4b illustrates a view of the alarming system of FIG. 4a from another perspective.

FIGS. 3, 4a and 4b respectively show enlarged views of the alarming system according to an embodiment of the invention. In the figures, for clarity, only the wiper blade adapter 41 and the wiper arm adapter 31 are shown. FIG. 3 shows the case where the first connecting member 1 is not engaged with the second connecting member 2, and FIGS. 4a and 4b shows the case where the first connecting member 1 is engaged with the second connecting member 2. Specifically, as shown in FIGS. 3, 4a and 4b, in this embodiment, the first connection member 1 is located in the housing of the wiper arm adapter 31, and the second connection member 2 is located in the housing of the wiper blade adapter 41.

Figure 5:
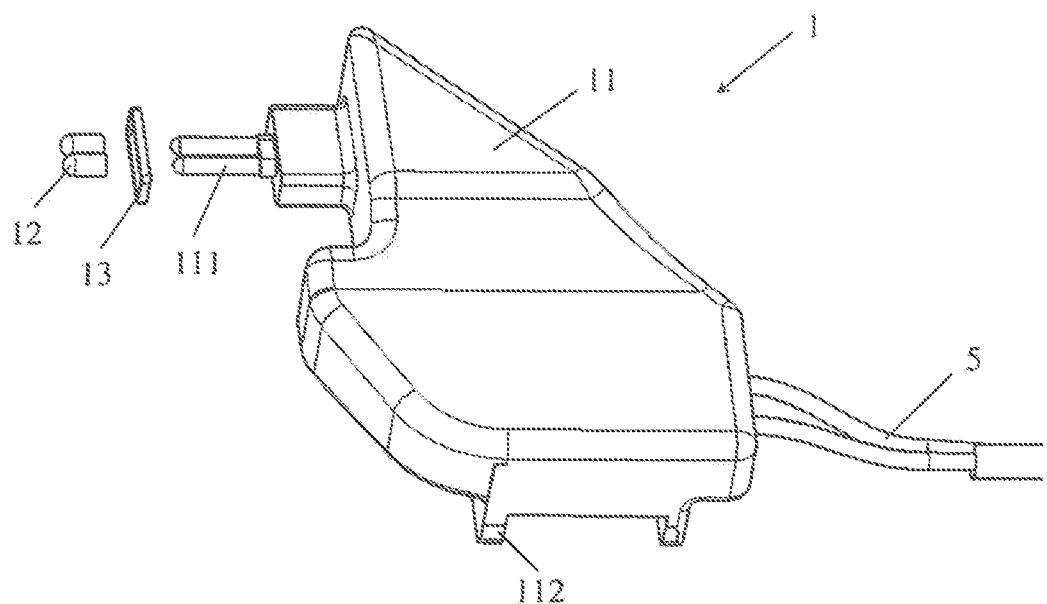
FIG. 5 illustrates an exploded view of the first connecting member according to an embodiment of the invention.
Figure 6:
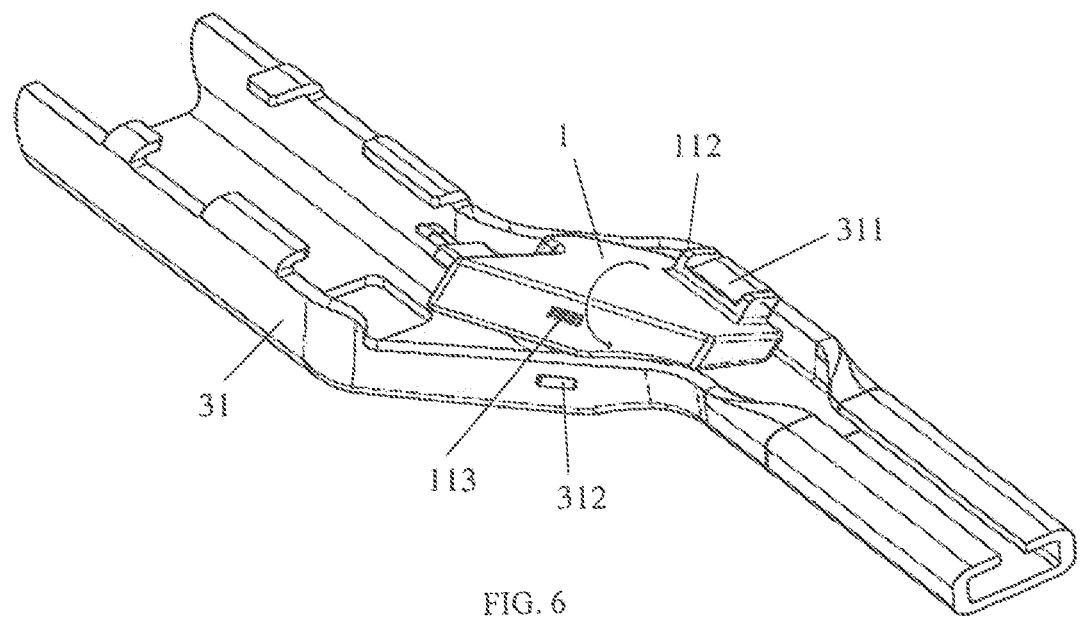
FIG. 6 illustrates a view of the first connecting member and wiper arm adapter according to an embodiment of the invention.

FIG. 5 illustrates an exploded view of the first connecting member 1 according to an embodiment of the invention, and FIG. 6 illustrates a view of the first connecting member and wiper arm adapter 31 according to an embodiment of the invention.

As shown in FIG. 5, the first connecting member 1 comprises a first body 11 and a first number of first contacts 12 which are insulated to each other and disposed at the first body 11. The first contacts 12 are made of electrically conductive material, and the first body 11 is made of insulated material. In this embodiment, the first number equals two, and the first number may also be selected as greater than two as required. For example, when the first number is greater than two, the additional first contacts 12 may be used to be charged with electricity to heat liquid, such as cleaning fluid, in the wiper.

As shown in FIG. 5, in this embodiment, two rod-shaped projections 111 are disposed on one side face of the first body 11, and the first contact elements 12 are respectively disposed on the outer surfaces of the rod-shaped projections 111. Specifically, two cylindrical rod-shaped projections 111 project from one side face of the first body 11, and two first contacts 12 are nested on the ends of the two rod-shaped projections 111 respectively and are made of electrically conductive material, such as copper. Specifically, the general shape of the first body 11 is adapted to be fixed in the housing of the wiper arm adapter 31. Alternatively, the first body 11 and the rod-shaped projections 111 may be of other shapes, respectively. Alternatively, the first contacts 12 may be provided at other positions of the outer wall of the rod-shaped projection 111, such as fully or partially cladding on the outer peripheral wall, or only disposed on the end surface. For example, in other embodiments, the first contacts 12 may be rod-shaped, which is connected to one side face of the first body 11. In the case where the first contacts 12 are rod-shaped, the first body 11 may not have the rod-shaped projections 111.

As shown in FIG. 5, the first connecting member 1 may further include a sealing gasket 13 disposed around the rod-shaped projection 111, and the sealing gasket 13 may be made of rubber material. When the first connecting member 1 and the second connecting member 2 are connected, the sealing gasket 13 is located between the first body 11 of the first connecting member 1 and the second body 21 of the second connection member 2 (the second body will be described in detail below) and seals therebetween.

As shown in FIG. 6, in this embodiment, the first connecting member 1 further includes two parallel positioning walls 112 protruding from one side face of the first body 11, and a buckle 113 at the other side face of the first body 11. Correspondingly, the wiper arm adapter 31 is provided with a positioning projection 311 and a snap groove 312. In this way, the first connecting member 1 can be snap-fitted into the housing of the wiper arm adapter 31. When mounting the first connecting member 1 onto the wiper arm adapter 31, firstly the orientation of the first connecting member 1 is adjusted, and then the positioning wall 112 receives the positioning projection 311 and finally the first connecting member 1 is pressed into the housing of the wiper arm adapter 31 in the direction of the arrow shown in FIG. 6, such that the buckle 113 is received into the snap groove 312. In other embodiments, the first connecting member 1 may also be fixed in the housing of the wiper arm adapter 31 in other manners, or the first connecting member may be connected to the wiper arm 3 other than the wiper arm adapter 31 in other ways. This other way is, for example, connecting by fasteners, adhering, welding, or the like. In addition, the first connecting member 1 may be connected to the wiper arm adapter 31 or other part of the wiper arm 3 through a flexible connection member such as a strap or a cord.

Figure 7A:
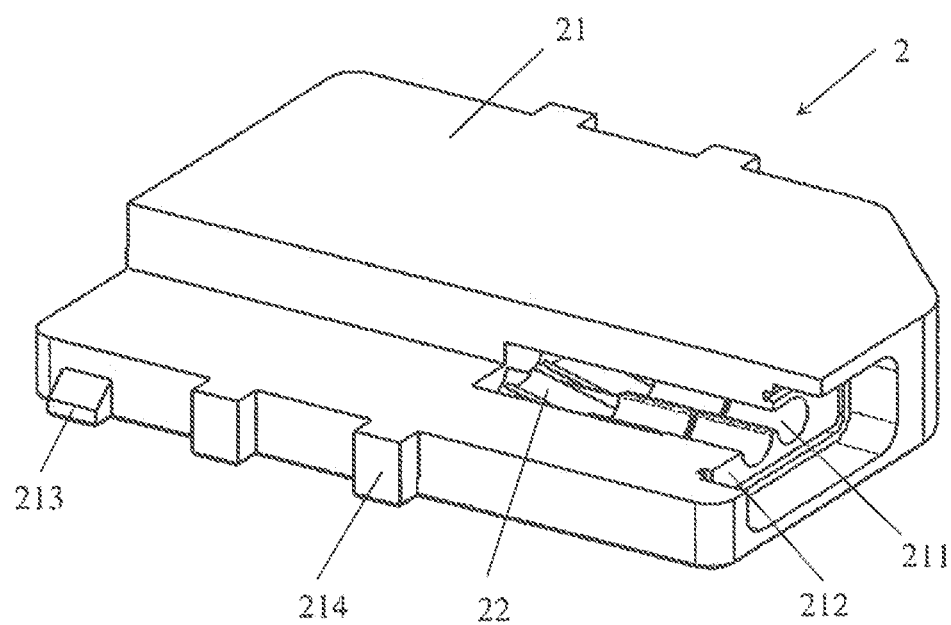
FIG. 7a illustrates a perspective view of the second connecting member according to an embodiment of the invention.
Figure 7B:
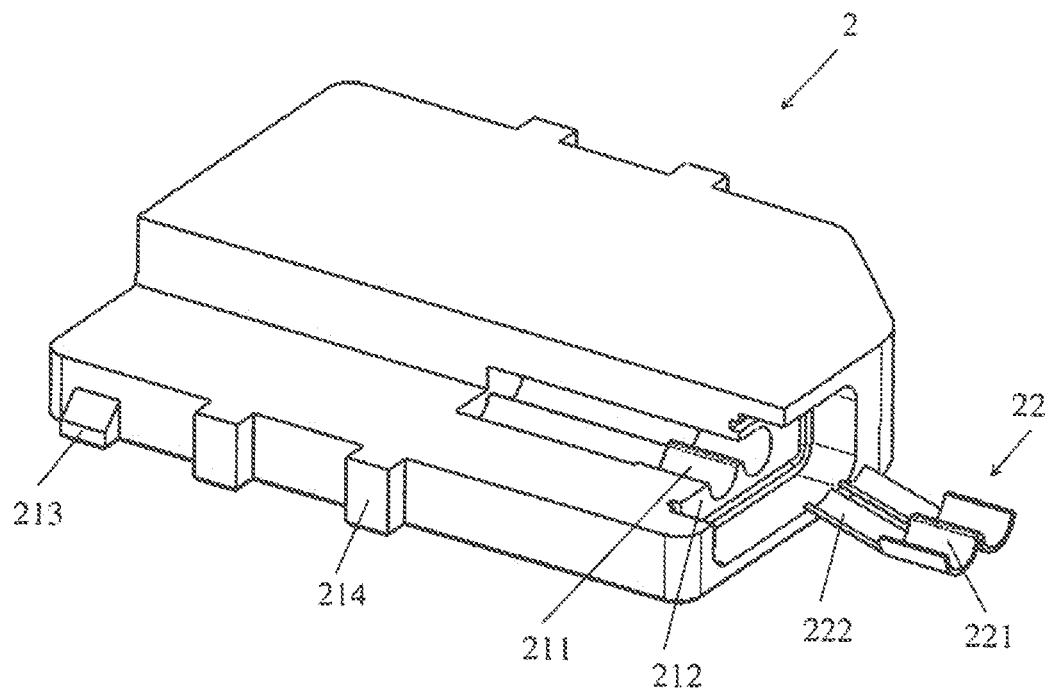
FIG. 7b illustrates an exploded view of the second connecting member according to an embodiment of the invention.
Figure 8A:
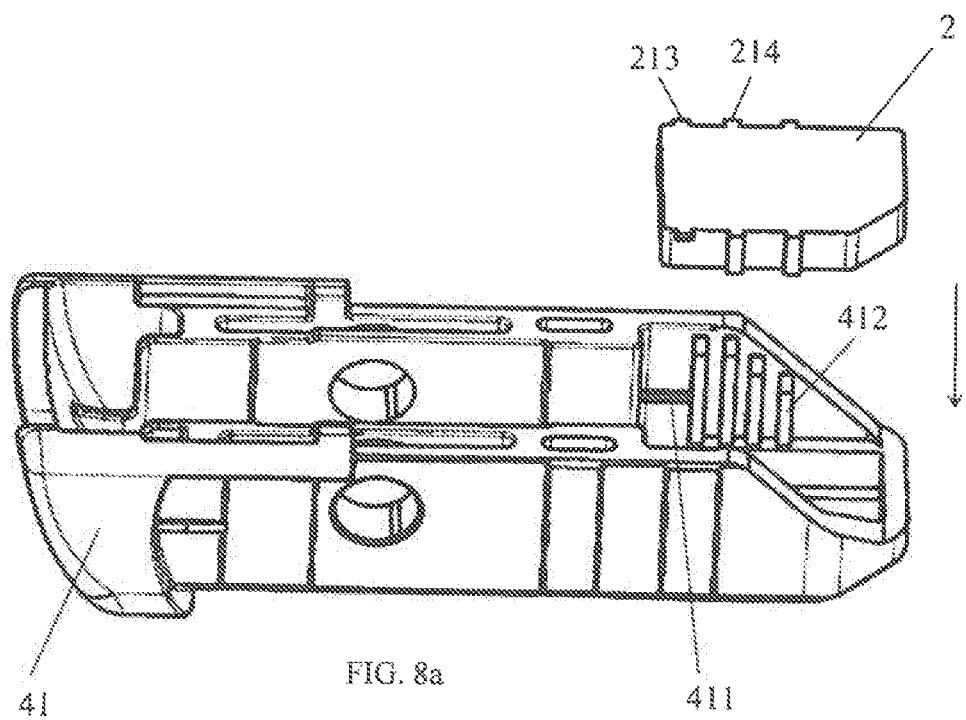
FIG. 8a illustrates a view of the second connecting member and wiper blade adapter according to an embodiment of the invention.
Figure 8B:
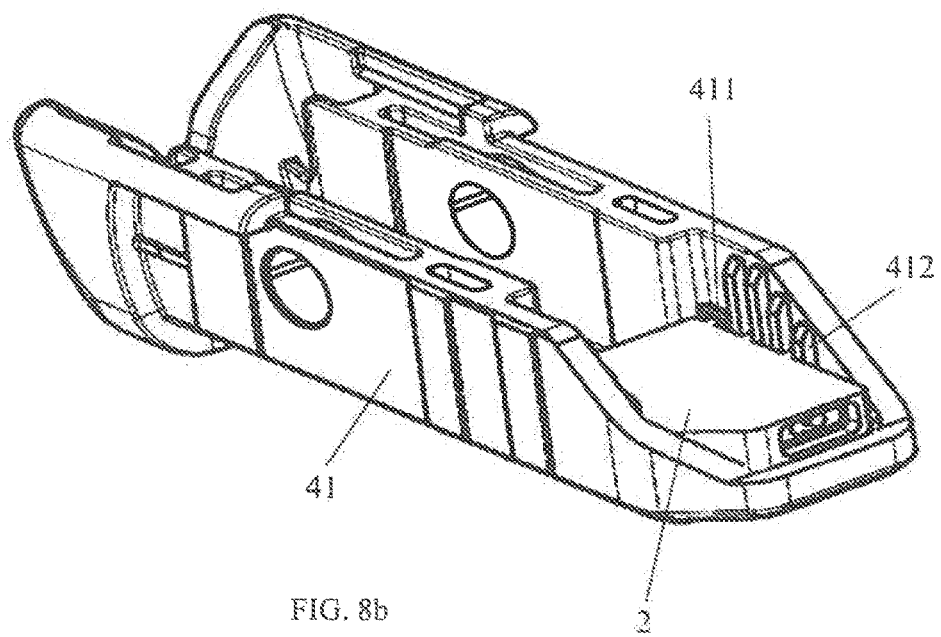
FIG. 8b illustrates another view of the second connecting member and wiper blade adapter according to an embodiment of the invention.

FIGS. 7a, 7b illustrates an exploded view of the second connecting member 2 according to an embodiment of the invention, respectively. FIGS. 8a, 8b illustrates a view of the second connecting member 2 and wiper blade adapter 41 according to an embodiment of the invention, respectively.

As shown in FIGS. 7a and 7b, the second connecting member 2 comprises a second body 21 and a first number of second contacts 22 which are electrically connected to each other and disposed at the second body 21. In this embodiment, the first number equals two. The second contacts 22 are made of an electrical conductive material, and the second body 21 is made of an insulated material. In this embodiment, two grooves 211 which open towards a same direction are provided on one side face of the second body 21, two second contacts 22 are disposed in these two grooves 211 respectively, and the grooves 211 receive the rod-shaped projections 111. Specifically, two cylindrical grooves 211 which open towards a same direction are provided on one side face surface of the second body 21, and are substantially complementary to the shapes of the two rod-shaped projections 111 of the first body 11, to allow the two grooves 211 to receive the two rod-shaped projections 111, respectively. Specifically, the second contact 22 is sheet-shaped, and includes a attaching portion 221 attached on the inner wall surface of the groove 211 and a press-contact portion 222 inclined to the central axis of the groove 211. The attaching portion 221 may be fixed on the inner wall surface of the groove 211 by pressing. Alternatively, the second contact 22 may also be in other shapes or be a coating, and may also be embedded in the inner wall of the groove 211 as long as at least one outer surface of the second contact 22 is exposed outwards. Two second contacts 22 may be integrally formed. Alternatively, the groove 211 is not limited to a hole shape and may be an open groove; the groove 211 is not limited to a cylindrical shape, and may be other shapes such as a cuboid.

As shown in FIGS. 7a and 7b, the second connecting member 2 may further include a sealing gasket mating groove 212 that is recessed inward from a side face which the opening of the groove 211 is towards.

As shown in FIGS. 8a and 8b, the shape of the second body 21 is adapted to be fixed in the housing of the wiper blade adapter 41. A first snap-fit structure 213 is also disposed on one side face of the second body 21, and a second snap-fit structure 411 which is mated with the first snap-fit structure 213 is disposed on the wiper blade adapter 41. In addition, the second body 21 is also provided with on the outer surface thereof a first positioning structure 214, and the wiper blade adapter 41 is provided with on the inner surface thereof a second positioning structure 412 that is mated with the first positioning structure 214, to facilitate the positioning and fixing of the second connecting member 2 in the housing of the wiper blade adapter 41. The second connecting member 2 can be snap-fitted into the housing of the wiper blade adapter 41. When mounting the second connecting member 2 onto the wiper blade adapter 41, firstly the orientation of the second connecting member 2 is adjusted, and then the second connecting member 2 is pressed into the housing of the wiper blade adapter 41 in the direction of the arrow shown in FIG. 8a. In other embodiments, the second connecting member 2 may be fixed in the housing of the wiper blade adapter 41 in other manners.

In this embodiment, as the first connecting member 1 and the second connecting member 2 are snap-fitted in the housing of the wiper arm adapter 31 and the housing of the wiper blade adapter 41 respectively, the first connecting member 1 and the second connecting member 2 can be easily mounted and detached and can achieve appropriate fixing effects, which allows the first connecting member 1 and the second connecting member 2 to be selected by users as options and be replaced easily.

Figure 9:
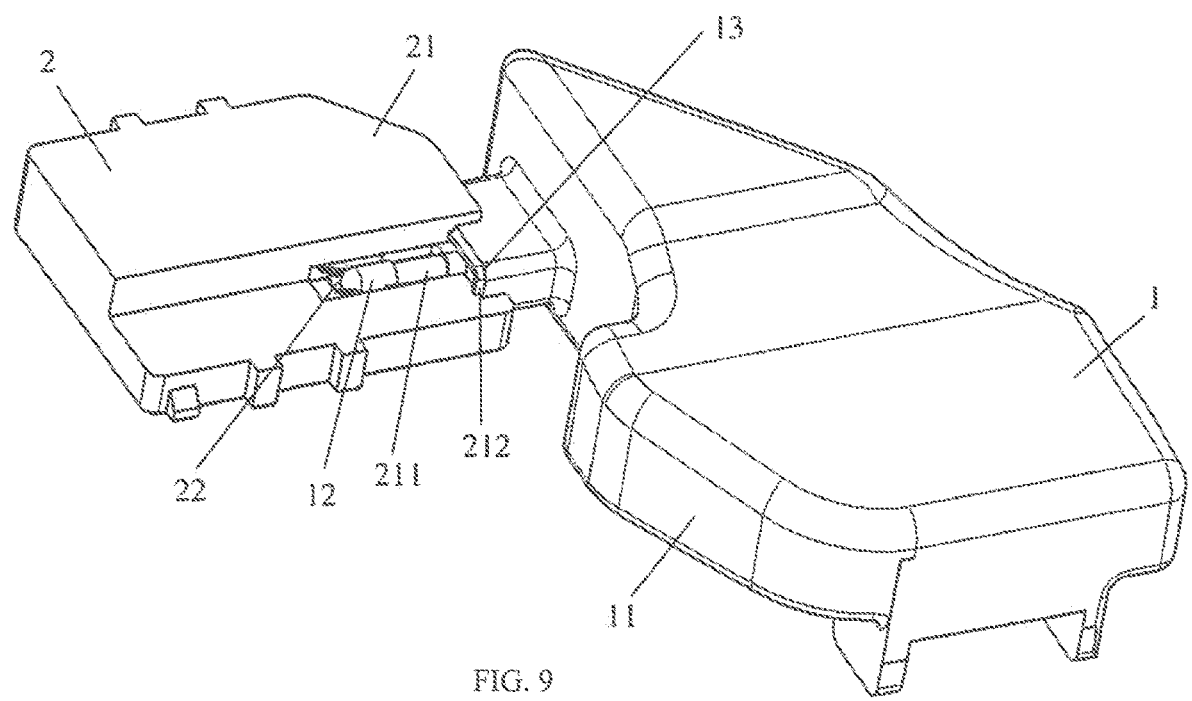
FIG. 9 illustrates a view showing the first connecting member and the second connecting member being connected together according to an embodiment of the invention.

FIG. 9 illustrates the first connecting member 1 and the second connecting member 2 being connected together according to an embodiment of the invention. Referring to FIGS. 3 and 9, the first connecting member 1 is fixed in the housing of the wiper arm adapter 31, and the second connecting member 2 is fixed in the housing of the wiper blade adapter 41. When the wiper blade adapter 41 is properly mounted to wiper arm adapter 31, said first connecting member 1 is connected to said second connecting member 2. Specifically, the extending direction of the cylindrical rod-shaped projections 111 of the first body 11, the extending direction of the grooves 211 of the second body 21, the long axis direction of the wiper arm adapter 31, and the long axis direction of the wiper blade adapter 41 are same. In this embodiment, as shown in FIG. 3, the wiper blade adapter 41 is pushed into the wiper arm adapter 31 in the direction of the arrow shown in FIG. 3, while the first connecting member 1 is connected to the second connecting member 2, such that the two rod-shaped projections 111 are respectively inserted into the two grooves 211, resulting in that the two first contacts 12 located on the outer surfaces of the rod-shaped projections 111 are in contact with the two second contacts 22 located in the grooves 211 respectively. In this way, the first contacts 12 that are electrically insulated from each other establish electrical connection therebetween by means of the second contacts 22 that are electrically connected to each other. Advantageously, the press-contact portion 222 of the second contact 22 presses against the first contact 12, such that the first contact 12 and the second contact 22 can be in better contact, and the sealing gasket 13 is received into the sealing gasket mating grooves 212 and are subjected to a pressure perpendicular to the surface thereof, such that the space in which the first contacts 12 and the second contacts 22 are located is well sealed to prevent the entry of liquid and prevent electric leakage.

In this embodiment, the connection between the first connecting member 1 and the second connecting member 2 may be fixed by the snap-fit member on the wiper arm adapter 41 and wiper arm adapter 31. In addition, corresponding snap-fit members may be provided on the first connecting member 1 and the second connecting member 2, to fix the connection between the first connecting member 1 and the second connecting member 2. The snap-fit members can apply pressure to the sealing gasket 13 in a direction perpendicular to its surface.

The wiper arm 3 and the wiper blade 4 of the motor vehicle are connected by a wiper arm adapter 31, which is typically located at the end of the wiper arm 3, and a wiper blade adapter 41, which is located near the mid-portion of the wiper blade 4, such that the wiper arm 3 drives the wiper blade 4 to swing back and forth. The wiper blade adapter 41 of the motor vehicle and the wiper arm adapter 31 corresponding thereto may be of various types. Herein, the direct insertion connection is used as an example for illustration, but is not limited thereto.

In some cases where the first connecting member 1 is connected to the wiper arm 3 by other means, the first connecting member 1 may be coupled with the second connecting member 2, for example, the first connecting member 1 may be inserted into the second connecting member 2 from one side, after assembling the wiper blade 4 to the wiper arm 3, that is, after assembling the wiper blade adapter 41 to the wiper arm adapter 31. For the wiper arm 3 and the wiper blade 4 which are assembled in other forms, the first connecting member 1 and the second connecting member 2 may be connected to the wiper arm 3 and the wiper blade 4 respectively in various ways, for example, the first connecting member 1 or the second connecting member 2 respectively does not necessarily be fixed in the housing of the wiper arm adapter 31 or the housing of the wiper blade adapter 41, and the mounting way and mounting sequence thereof may also be modified, as long as when the wiper blade 4 is properly mounted to the wiper arm 3, the first connecting member 1 is connected with the second connecting member 2 (not necessarily simultaneously), such that each of the first contacts 12 is in contact with the corresponding second contact respectively, and thus the first contacts 12 are electrically connected to each other through the second contacts 22.

The alarming system for the wiper may further include a control member (not shown in the figures), which is configured to sense the electrical connection between the first contacts 12, and to generate an alarm signal when the electrical connection between the first contacts 12 is disconnected.

The control member may be located at the body of the vehicle, and specifically, the control member may be included in ECU of the vehicle. As shown in FIG. 2, the first connecting member 1 is connected to the corresponding inputs of the ECU by signal lines 5. Since the wiper arm 3 is moved at the time of operation, at least a part of the signal line 5 extends along the wiper arm 3 and is fixed to the wiper arm 3, in order to prevent the signal line 5 from being wound or damaged.

Figure 10:
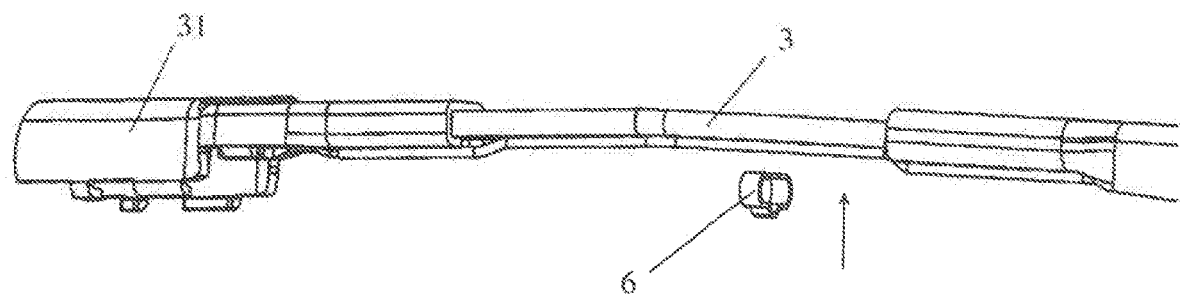
FIG. 10 illustrates a view of the wiper arm and the signal line retaining clip according to an embodiment of the invention.
Figure 11:
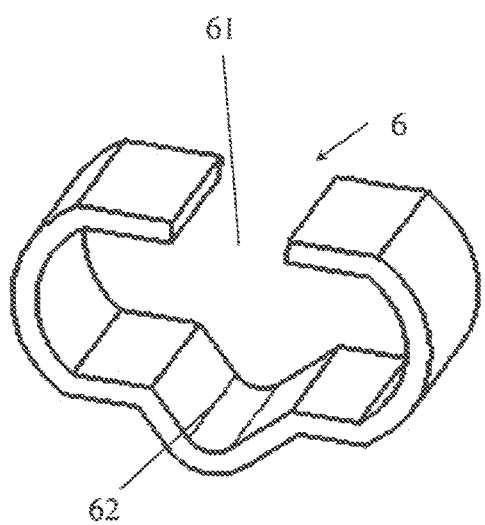
FIG. 11 illustrates a perspective view of the line signal retaining clip according to an embodiment of the invention.

FIG. 10 illustrates a view of the wiper arm 3 and the signal line retaining clip 6 according to an embodiment of the invention. FIG. 11 illustrates a perspective view of the signal line retaining clip 6 according to an embodiment of the invention. As shown in FIG. 10, the signal line 5 can be fixed to the wiper arm 3 by the signal line retaining clip 6. As shown in FIG. 11, the signal line retaining clip 6 is substantially an annular structure having an opening 61, and the signal line retaining clip 6 further includes a recess 62 that protrudes outward. As shown in FIG. 10, the signal line retaining clip 6 has elasticity, its opening can be temporarily expanded. The signal line retaining clip 6 can be nested on the wiper arm 3 from the direction shown in FIG. 10, and the signal line 5 is fixed in the recess 62. Alternatively, the signal line 5 may also be located in the interior cavity of the wiper arm 3.

As described above, when the wiper blade 4 is properly mounted to the wiper arm 3, the first connecting member 1 and the second connecting member 2 are connected so that each of the first contacts 12 is respectively in contact with the corresponding second contact, thereby the two first contacts that are insulated from each other establish electrical connection therebetween by two second contacts 22 that are electrically connected to each other.

When the wiper blade 4 is detached from the wiper arm 3, for example when it is stolen, since the first connecting member 1 is connected to the wiper arm 3 and the second connecting member 2 is connected to the wiper blade 4 (specifically, for example, the first connecting member 1 is fixed in the housing of the wiper arm adapter 31, and the second connecting member 2 is fixed in the housing of the wiper blade adapter 41), the first connecting member 1 is not removed together with the wiper blade 4, while the second connecting member 2 is removed together with the wiper blade 4. In this way, the first connecting member 1 is no longer connected with the second connecting member 2, thereby causing the electrical connection between the two first contacts 12 through the second contact 22 to be disconnected. After the control member senses that the electrical connection between the two first contacts 12 is disconnected, an alarm signal is generated. Here, the control member includes the ECU, the ECU generates an alarm signal, and may control the alarm of the vehicle to generate a sound, and may also control the camera on the motor vehicle to capture the image around the motor vehicle.

The control member may also be configured to send alarm information to alarm information receiver. The alarm information receiver may be a mobile terminal, for example, a user's smart phone, tablet computer, laptop computer and the like. The alarm information receiver can also be a computer, a server, etc., and the server can further push related alarm information to the user. In this way, the user can instantly know the abnormal condition of the wiper blade 4 on the wiper. After the mobile terminal receives the alarm information, it can receive the image(s) captured by the camera to view the situation around the motor vehicle, or can turn off the alarm, and so on.

The alarming system can also monitor whether the wiper blade 4 is properly mounted on the wiper arm 3. For example, in the embodiment shown in FIG. 3, if the wiper blade 4 is not properly mounted on the wiper arm 3, the first contact 12 and the second contact 22 can not contact well, resulting in a disconnection of the electrical connection between the first contacts 12, and further causing the control member to generate an alarm signal.

Figure 12:
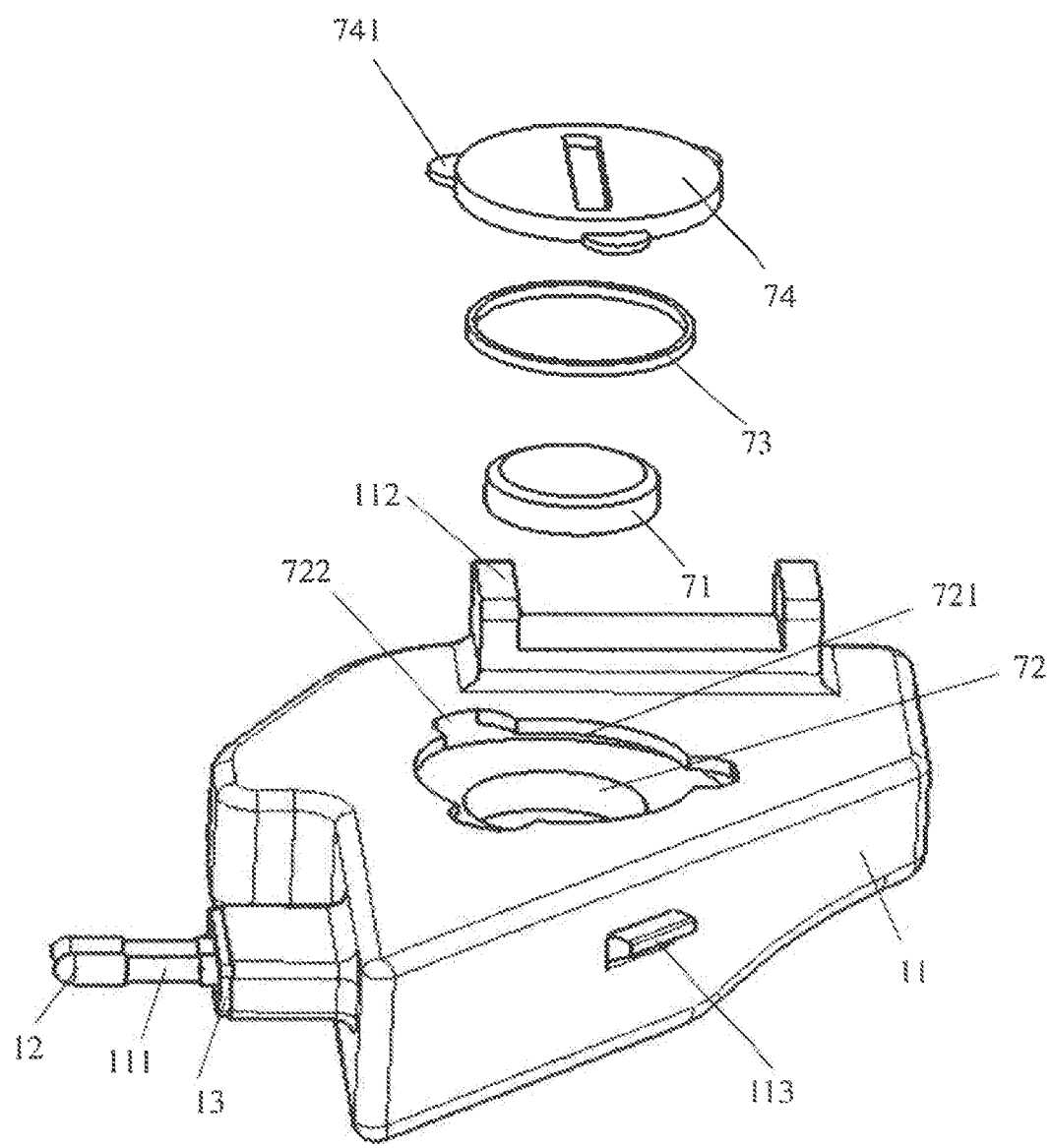
FIG. 12 illustrates an exploded view of the first connecting member according; to another embodiment of the invention.

FIG. 12 illustrates an exploded view of the first connecting member 1 according to another embodiment of the invention. As shown in FIG. 12, the alarming system further comprises a wireless transmitting member positioned in the first body 11 and a wireless receiving member coupled to the control member. The wireless receiving member may be included in the control member. The control member may be configured to sense the electrical connection between the first contacts 12 via the wireless transmitting member and the wireless receiving member. The first contacts 12 may be electrically connected to respective inputs of the wireless transmitting member, and the wireless transmitting member and the wireless receiving member may communicate via protocols such as Bluetooth, ZigBee, NFC, and the like. Specifically, the wireless transmitting member sends a signal to the wireless receiving member when the electrical connection between the first contacts 12 is disconnected. The wireless receiving member then sends a signal to the control member if the wireless receiving member is a member independent of the control member, and in this way, the control member senses the disconnection of the electrical connection between the first contacts 12, thereby generating an alarm signal. If the wireless receiving member is included in the control member, the control member directly receives the transmitted signal sent from the wireless transmitting member, and in this way, the control member senses the disconnection of the electrical connection between the first contacts 12, thereby generating an alarm signal.

The wireless transmitting member may include a battery 71 for supplying power. As shown in FIG. 12, the battery 71 is a button battery, and a battery space 72 for accommodating the battery 71 is provided in the first body 11. In addition, a seal ring 73 and a battery cap 74 for enclosing the battery space 72 are provided above the battery 71. The battery cap 74 is provided with a radial projection 741 on an outer periphery thereof, and the battery space 72 is provided with a radial groove 721 mated with the radial projection 741 and a mounting opening 722 that has a shape mated with the shape of the radial projection 741. A battery cap 74 is placed in the mounting opening 722, the battery cap 74 is rotated, such that the battery cap 74 is snap-fitted into the radial groove 721, and a vertical direction force is applied to the seal ring 73 to seal the battery space 72. The wireless transmitting component and the wireless receiving component may be, for example, a Bluetooth transmitting member and a Bluetooth receiving member.

In other embodiments, if the first connecting member 1 does not need to be connected to the control member on the vehicle body in a wired manner, for example, if the control member senses the connection between the first contact 12 through the wireless transmission member and the wireless receiving member, the first connecting member 1 may also be connected to the wiper blade 4, and the second connecting member 2 may be connected to the wiper arm 3.

In other embodiments, the first connecting member 1 and the second connecting member 2 may be in other configurations.

For example, in an embodiment, the first body 11 is provided with a first number of grooves that open in a same direction, and the first contacts 12 are disposed in the first number of grooves respectively. The second body 21 is provided with on one side face thereof a first number of rod-shaped projections, the second contacts 22 are disposed on outer surfaces of the first number of rod-shaped projections, and said grooves receive said rod-shaped projections.

For example, in an embodiment, the first body 11 is provided with a first number of grooves that open in a same direction, and the first contacts 12 are disposed in the first number of grooves respectively. The second contacts 22 are rod-shaped and are connected to one side face of the second body 21, and the grooves receive the rod-shaped second contacts 22.

For example, in an embodiment, the first body 11 and the second body 21 are respectively provided with complementary-shaped portions that are mutually received, so that the first contacts 12 are respectively in contact with the second contacts 22. The complementary-shaped portions may not be limited to receive each other by means of plugging.

A wiper blade assembly with an alarming function according to the invention is described below.

The wiper blade assembly with an alarming function according to an embodiment of the invention includes a wiper blade 4, a wiper blade adapter 41, and a second connecting member 2. The second connecting member may be fixed in a housing of said wiper blade adapter 41, and comprises a second body 21 and a first number of second contacts 22 which are disposed at the second body 21 and are electrically connected to each other. In this embodiment, the first number equals 2. Alternately, the first number may be greater than two. The second contacts 22 may be made of an electrical conductive material, and the second body 21 may be made of an insulated material. In this embodiment, two grooves 211 which open towards a same direction are provided on one side face of the second body 21, and two second contacts 22 are disposed in the two grooves respectively. Alternatively, two rod-shaped projections may be provided on one side face of the second body 21, and two second contacts 22 may be disposed on the outer surfaces of the two rod-shaped projections respectively. Alternatively, the second contacts 22 may be rod-shaped and be connected to one side face of the second body 21.

The wiper blade assembly with an alarming function according to another embodiment of the invention includes a wiper blade 4, a wiper blade adapter 41, a first connecting member 1 and a wireless transmitting member. The first connecting member is fixed in a housing of the wiper blade adapter 41, and comprises a first body 11 and two first contacts 12 which are disposed at the first body 11 and are electrically insulated to each other. The wireless transmitting member is located in the first body 11, and the first contacts 12 are electrically connected to corresponding inputs of the wireless transmitting member respectively. The first contacts 12 are made of an electrical conductive material, and the first body 11 is made of an insulated material. In this embodiment, two rod-shaped projections are provided on one side face of the first body 11, and two first contacts 12 are disposed on the outer surfaces of the two rod-shaped projections respectively. Alternatively, the first contacts 12 may be rod-shaped and be connected to one side face of the first body 11. Alternatively, two grooves which open towards a same direction may be provided on one side face of the first body 11, and the first contacts 12 are disposed in the two grooves respectively.

The scope of the present invention is not limited by the above-described embodiments, but is defined by the appended claims and the equivalents thereof.

The invention claimed is:

1. An alarming system for a wiper, characterized in that, the alarming system comprises:
    a first connecting member comprising a first body and a first number of first contacts which are insulated to each other and disposed at the first body;
    a second connecting member comprising a second body and a first number of second contacts which are electrically connected to each other and disposed at the second body; and
    a control member;
    wherein:
    any one of the first connecting member or the second connecting member is disposed in a wiper arm adapter and separably connected to a wiper arm and the other one of the first connecting member or the second connecting member is disposed in a wiper blade adapter and separably connected to a wiper blade,
    the first contacts and the second contacts are made of conductive material, the first body and the second body are made of insulated material, the first number is equal to or larger than two,
    when the wiper blade is properly mounted to the wiper arm, the first connecting member is connected with the second connecting member, such that each of the first contacts is in contact with corresponding one of the second contacts, and thereby the first number of the first contacts are electrically connected to each other through the first number of the second contacts, and
    the control member is configured to sense the electrical connection between the first contacts, and to generate an alarm signal when the electrical connection between the first contacts is disconnected.

2. The alarming system of claim 1, wherein the control member is configured to send an alarm information to an alarm information receiver.

3. The alarming system of claim 2, wherein the alarm information receiver is a mobile terminal.

4. The alarming system of claim 1, wherein a control system is configured to control a camera of a vehicle to capture images surrounding the vehicle or to ring an alarm of the vehicle after generating the alarm signal.

5. The alarming system of claim 1, wherein the control member is located at a body of the vehicle.

6. The alarming system of claim 5, wherein the control member is included in an electronic control unit of the vehicle.

7. The alarming system of claim 5, wherein the one of the first connecting member and the second connecting member which is connected to the wiper arm is the first connecting member, the first contacts are connected to corresponding inputs of the control member through signal lines respectively, and at least a portion of the signal lines extend along the wiper arm and are fixed to the wiper arm.

8. The alarming system of claim 5, further comprising:
    a wireless transmitting member and a wireless receiving member,
    wherein the control member is configured to sense the electrical connection between the first contacts by the wireless transmitting member and the wireless receiving member, the wireless transmitting member is located in the first body, the first contacts are electrically connected to corresponding inputs of the wireless transmitting member respectively, and the control member is coupled to the wireless receiving member or comprises the wireless receiving member.

9. The alarming system of claim 1, wherein the second body is provided with on one side face thereof a first number of grooves which are open towards a same direction, and the first number of the second contacts are disposed in the first number of grooves respectively.

10. The alarming system of claim 9, wherein the first body is provided with on one side face thereof a first number of rod-shaped projections, and the first number of first contacts are disposed on outer surfaces of the first number of rod-shaped projections respectively; and the grooves receive the rod-shaped projections.

11. The alarming system of claim 9, wherein the first contacts are of rod shape, and are connected to one side face of the first body; and the grooves receive the first contacts.

12. The alarming system of claim 9, wherein the other one of the first connecting member and the second connecting member is connected to the wiper blade adapter, and an extending direction of the grooves is in consistent with a longitudinal axis of the wiper blade adapter.

13. The alarming system of claim 1, wherein the first body is provided with on one side face thereof a first number of grooves which are open towards a same direction, and the first number of the first contacts are disposed in the first number of grooves respectively.

14. The alarming system of claim 13, wherein the second body is provided with on one side thereof a first number of rod-shaped projections, the first number of second contacts are disposed on outer surfaces of the first number of rod-shaped projections respectively; and the grooves receive the rod-shaped projections.

15. The alarming system of claim 13, wherein the second contacts are of rod shape, and are connected to one side face of the second body and the grooves receive the second contacts.

16. The alarming system of claim 13, wherein the other one of the first connecting member and the second connecting member is connected to the wiper blade adapter, and an extending direction of the grooves is in consistent with a longitudinal axis of the wiper blade adapter.

17. The alarming system of claim 1, wherein the other one of the first connecting member and the second connecting member is snap-fitted in a housing of the wiper blade adapter.

18. The alarming system of claim 17, wherein the one of the first connecting member and the second connecting member is snap-fitted in a housing of the wiper arm adapter.

19. The alarming system of claim 17, wherein the one of the first connecting member and the second connecting member is connected to the wiper arm by a flexible connecting member.

20. The alarming system of claim 1, wherein while the wiper blade adapter is properly mounted to the wiper arm adapter, the first connecting member is connected to the second connecting member.

21. The alarming system of claim 1, wherein the first number of second contacts are formed in one piece.

22. The alarming system of claim 1, wherein the first body is formed integral with the wiper arm adapter, the second body is formed integral with the wiper blade adapter.

* * * * *